United States Patent [19]
List et al.

[11] 3,791,204
[45] Feb. 12, 1974

[54] ROLLING MILL FORCE MEASURING APPARATUS

[75] Inventors: Harold A. List; Jack H. Baker, both of Bethlehem, Pa.

[73] Assignee: Bethlehem Steel Corporation, Bethlehem, Pa.

[22] Filed: Aug. 28, 1972

[21] Appl. No.: 283,995

[52] U.S. Cl. ............................. 73/88.5 R, 324/130
[51] Int. Cl. ........................... G01l 1/22, G01b 7/18
[58] Field of Search. 73/1 B, 88.5 R, 88.55 D, 15.6; 324/130

[56] References Cited
UNITED STATES PATENTS
| | | | |
|---|---|---|---|
| 3,714,806 | 2/1973 | Berkey et al. | 73/88.5 R X |
| 3,338,091 | 8/1967 | Tatum | 73/88.5 R |
| 2,659,154 | 11/1953 | Rendel | 73/88.5 R |

OTHER PUBLICATIONS
C. A. Bowes, "Variable Resistance Sensors Work Better with Constant Current Excitation," Oct. 1966.

Primary Examiner—Charles A. Ruehl

[57] ABSTRACT

A means for making a simple and economical roll force measurement on rolling mill stands. A strain gage consisting of a half-bridge of vertical and horizontal semiconductor strain elements is cemented to opposing strain sites on a given post of both side frames of a rolling mill stand. These half-bridges are wired into a full-bridge strain gage circuit for each post which is responsive to post strain as a function of roll force, but is not responsive to bending moments in the post. Thermal variations affecting strain gage sensitivity are compensated for by energizing each full-bridge circuit with a separate constant current source. Thermal and mechanical drift affecting strain gage zero are compensated for by automatically nulling amplified strain gage output signals by electronic means during the absence of a workpiece in the rolling mill stand. Roll force signals from individual posts, or their sum, are selectively fed to a utilization device such as a roll force indicator or controller.

4 Claims, 4 Drawing Figures

ROLLING MILL FORCE MEASURING APPARATUS

BACKGROUND OF THE INVENTION

1. Field of the Invention

This invention relates broadly to improved force measuring apparatus. More particularly, the invention relates to apparatus for measuring roll forces in a rolling mill stand.

2. Description of the Prior Art

It is well known in the steel rolling mill practice that roll force is one of a number of factors in determining the amount of thickness reduction a workpiece experiences during passage through a set of rolls in a rolling mill stand. Likewise, the knowledge of roll force is important to a rolling mill operator to prevent overloading of mill rolls and mill stand structures.

Heretofore, rolling mill stands were provided with a mechanical screw position indicator which, together with other factors, enabled a rolling mill operator to estimate to a limited degree the material thickness exiting from a mill stand. This procedure was improved upon by S.J.A.M. Bagno in U.S. Pat. No. 2,276,816 who provided an electromagnetic micrometer type of strain gage mounted on each side frame of a rolling mill stand to measure strain in the frame and to indicate frame deflection as a function of roll force. Bagno also provided electromechanical servo nulling of the roll force indicator during the absence of a workpiece in the mill stand because daily and seasonal temperature variations caused thermal and mechanical drift which affected the strain gage zero value. Although Bagno was an improvement, he failed to recognize that roll force strains differed at various locations in side-frame posts and that extraneous lateral drive forces and longitudinal tensioning forces produce bending moments which have an erroneous effect on the roll force strain detected at his strain gage locations. In addition, Bagno did not compensate for strain gage sensitivity changes with temperature variations.

In an endeavor to overcome the drawbacks of Bagno, various other methods of determining roll forces have been advanced. For example, R. Green in U. S. Pat. No. 3,177,346 discloses a load cell responsive to roll forces applied to work rolls in a rolling mill stand in which load signals are used in a computer to determine slab thickness and load limit indications. This method requires precise and expensive machining of both load cell and rolling mill structures so as to limit load applications along the load cell axis. Furthermore, rolling mill structures must be designed to accommodate the load cell installation. This limits the application of the Green invention to new rolling mills because existing rolling mills generally cannot be easily adapted to include a load cell installation.

SUMMARY OF THE INVENTION

One of the objects of this invention is to provide improved roll force measuring apparatus which overcomes the foregoing difficulties.

Another of the objects of this invention is to provide roll force measuring apparatus which includes strain gages so located on a rolling mill stand as to be solely responsive to roll forces while cancelling the effects of extraneous forces thereon.

Another object of this invention is to provide said roll force measuring apparatus with strain gages having a high sensitivity in a noisy environment of contemporary rolling mills.

A further object of this invention is to provide said roll force measuring apparatus with electronic means for compensating for thermal and mechanical effects on strain gage sensitivity and zero shift due to temperature variations of the strain site on the rolling mill stand.

Another object of this invention is to provide said roll force measuring apparatus for both old and new rolling mill stands without using a load cell or reconstructing the mill stand, thereby substantially reducing the cost and complexity of roll force measurements.

The foregoing objects can be obtained by roll force measuring apparatus which employs a strain gage consisting of a half-bridge of vertical and horizontal semiconductor strain elements cemented to opposing strain sites on a given post on both side frames of the rolling mill stand. Half-bridges are wired into a full-bridge strain gage circuit for each side frame which is responsive to post strain as a function of roll force, but is not responsive to bending moments in the post. Thermal variations affecting strain gage sensitivity are compensated for by energizing each full-bridge circuit with a separate modified constant current source for one type of post material, or alternatively, a modified constant voltage source for another type of post material. Thermal and mechanical drift affecting strain gage zero are compensated for by automatically nulling amplified strain gage output signals by electronic means during the absence of a workpiece in the rolling mill stand. Roll force signals from individual posts, or their sum, are selectively fed to a utilization device such as a roll force indicator or controller.

DESCRIPTION OF THE PREFERRED EMBODIMENT

Figure 1:
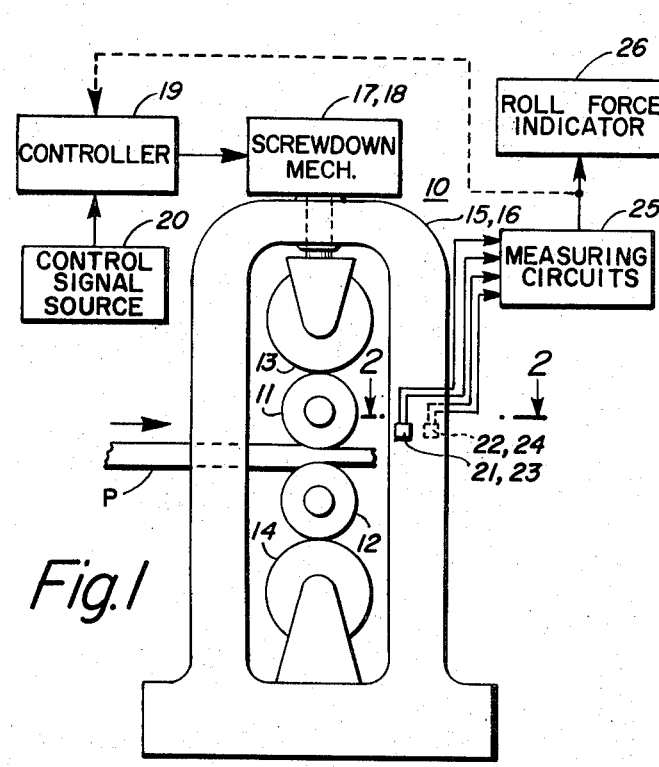
FIG. 1 is a diagrammatical representation of the roll force measuring apparatus of the present invention.

Referring to the drawings, particularly FIG. 1, a conventional rolling mill stand 10 reduces the thickness of hot plate P while being drawn through horizontal work rolls 11 and 12, the latter being driven by a mechanism not shown and backed up by rolls 13 and 14. Mill stand 10 is provided with upright drive side frame 15 and work side frame 16, each having fore and aft posts spaced apart and adapted to movably constrain rolls 11 to 14. Each end frame 15 and 16 includes a screwdown mechanism 17 and 18, respectively, which reacts against the posts of its associated side frame while applying a working force through rolls 11 to 14 to reduce the thickness of hot plate P. Screwdown mechanisms 17 and 18 operate to apply the roll force in response to signals from controller 19, the latter operating under control of control signal source 20.

The reaction forces of screwdown mechanisms 17 and 18 on the posts of side frames 15 and 16, respectively, produce an equal amount of post strain in each side frame, which post strain is proportional to roll force. However, it has been discovered that additional forces such as those produced by lateral drive forces and longitudinal tensioning forces in certain types of rolling mills, produce bending moments which results in additional strain being produced in the side frame posts. These additional forces are considered to have an equal and undesirable effect on strain in each post of its associated end frame 15 and 16.

Figure 2:
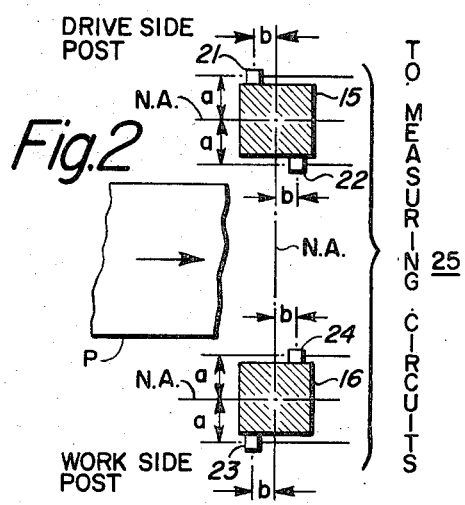
FIG. 2 is a cross-sectional plan view of rolling mill stand side frame posts showing strain gage sites.

In order to translate post strain into roll force only, the ideal location of a strain measuring device would be within a side frame post along its neutral axes to avoid the strain produced by the aforesaid bending moments. As is often the case in practice, the ideal location is nearly impossible to achieve, particularly in existing rolling mill stand frames. For this reason, FIGS. 1 and 2 show strain gages 21 and 22 applied to opposing strain sites on a given post of drive side frame 15, and strain gages 23 and 24 also applied to opposing strain sites on a given post of work side frame 16. Strain gages 21 and 23 are located on outside-post strain sites equidistant from their respective neutral axes (N.A.) as shown by dimensions "a" and "b", and located diagonally opposite strain gages 22 and 24. Strain gages 22 and 24 are located on inside-post strain sites also equidistant from said neutral axes (N.A.) also shown by dimensions "a" and "b". In this manner, the additional strain produced in each post by bending moments is effectively cancelled in the strain gage arrangement by the combination of strain gages 21–22 on the post of side frame 15 and 23–24 on the post of side frame 16 by virtue of equal and opposite post strains produced at their respective sites by the bending moments.

With the exception noted below, the aforesaid strain gage arrangement leaves only roll force strains in the given posts of side frames 15 and 16 to activate strain gages 21–22 and 23–24, respectively. These strain gages are connected to measuring circuits 25 which are shown as a block in FIG. 1 and schematically in FIG. 4. The output signals of measuring circuits 25 drive a roll force indicator 26, or alternatively, are fed to controller 19 to modify the control signals from source 20.

Normally the strain in rolling mill stand side frames 15 and 16 is very low, for example, on the order of about 5 microinches for a 1000 ton roll force per side frame. Further, contemporary rolling mill stands operate in a noisy environment. For these reasons, each strain gage 21 to 24 consists of an active half-bridge of vertical (V) and horizontal (H) oriented semiconductor strain gage elements whose impedance varies with strain, such as sold by BLH Electronics, Inc., Waltham, Mass., Cat. No. SPB2-18-100. These strain gages are arranged at strain sites as detailed in FIG. 3 and are subject to temperature variations thereat which vary strain gage sensitivity. The sensitivity of semiconductor strain gage elements however is much higher than resistance-wire type of strain gages, and considerably greater than electromechanical micrometers. This feature permits such gage elements to be used in a noisy environment while enabling considerably less expensive and more reliable strain gage signal conditioning equipment to be used in measuring circuits 25 than heretofore attainable.

Figure 3:
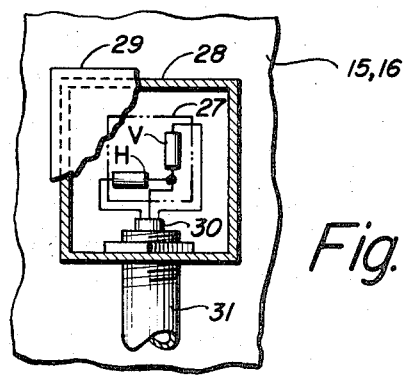
FIG. 3 is a typical strain gage installation detail at a strain site.

With reference to FIG. 3, a typical installation of strain gages 21 to 24 is shown at strain site 27 which may be located on either the outside or inside face of a post in either end frame 15 or 16. Strain site 27 is prepared by grinding smooth each post face and then cementing a V semiconductor strain gage element in a vertical strain path and an H semiconductor strain gage element in a horizontal strain path, both with respect to the aforesaid neutral axes (N.A.). The V and H gage elements are connected electrically in a half-bridge circuit arrangement and then covered with an electrically insulating material not shown. For protection against mechanical abrasion and electrical interference, each strain gage 21 to 24 is surrounded by a metal box 28 secured to a post face of side frame 15 or 16 and covered with removable cover 29. A multi-conductor shielded electrical cable 30 is connected to the half-bridge strain gage terminals and fed through conduit 31 in a side wall of box 28 to measuring circuits 25.

Figure 4:
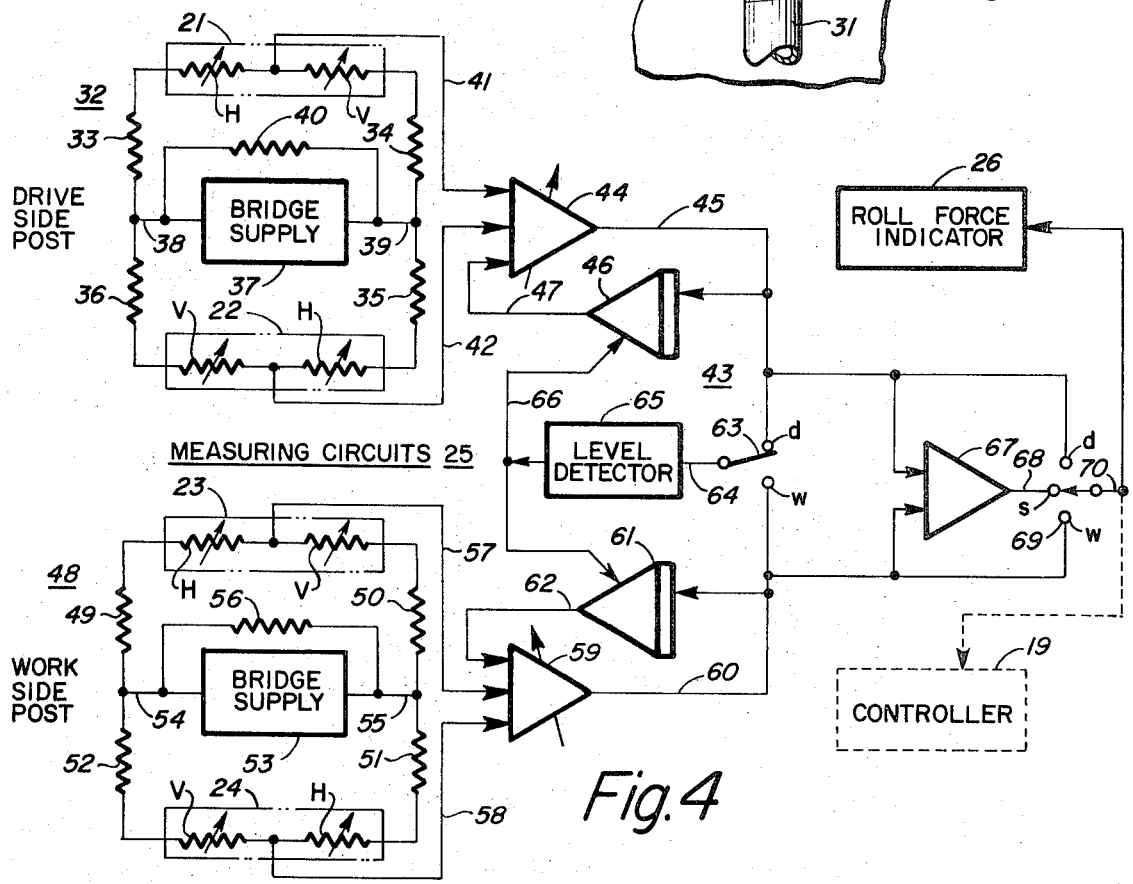
FIG. 4 is a schematic diagram of the strain gage and electronic circuitry of the roll force measuring system.

Turning now to FIG. 4, measuring circuits 25 include circuit means for connecting half-bridge strain gages 21 and 22 into a full-bridge strain gage circuit 32 which is responsive to roll force strain in the post of drive side frame 15. Occasionally, semiconductor strain element impedance varies from element-to-element. Hence, balancing resistors 33 and 34 are provided for half-bridge strain gage 21, and balancing resistors 35 and 36 are provided for half-bridge strain gage 22, so as to effect a uniform bridge arm impedance for strain gage circuit 32. Where any of the semiconductor strain elements are obtained with a predetermined impedance, then their corresponding balancing resistor 33 to 36 may be deleted from circuit 32.

It will be observed from the drawings that half-bridge strain gages 21 and 22 are mounted on opposing strain sites and connected electrically into a full-bridge strain gage circuit 32 with vertical (V) strain elements in opposite arms of the full bridge circuit and adjacent horizontal (H) strain elements in the remaining opposite arms. As noted above, the mounting of strain gages on opposite strain sites of a side frame post cancels the extraneous strain effects on the strain gages caused by the aforesaid bending moments. However, temperature variations caused by environmental and hot steel plate P sources fluctuate on a daily basis, as well as a seasonal basis, which in turn causes both thermal and mechanical drift on strain gage zero and thermal variations on strain gage sensitivity. By circuiting the horizontal (H) strain elements in opposite arms of the full-bridge circuit 32 and adjacent the companion vertical (V) strain element in a given half-bridge, then a substantial amount of drift compensation is provided in each half-bridge 21 and 22 as well as the full-bridge circuit 32. Circuiting the horizontal (H) strain elements in opposite bridge arms also causes an increase in bridge output on leads noted below by summing the vertical strain on both strain sites of a given post with the horizontal strain at the same sites according to well known Poisson's Ratio.

Measuring circuits 25 also include bridge supply 37 which is connected to input leads 38 and 39 of full-bridge strain gage circuit 32. When the strain modulus, i.e., the rolling mill stand posts, is cast steel as is generally the case in rolling mill stand posts, then it is preferred that bridge supply 37 be a constant current source as opposed to a constant voltage source. A constant current source of predetermined intensity will continuously compensate for the aforesaid thermal variations on strain gage sensitivity. This is accomplished by bridge supply 37 varying the voltage appearing on bridge input leads 38 and 39 so as to maintain strain gage bridge 32 current at a predetermined constant value.

When a slight deviation from a constant current source is desired, then voltage modifying resistor 40 is shunted across bridge input leads 38 and 39 to slightly modify the current flow through bridge circuit 32. The value of resistor 40 is determined by adjusting its value until the strain gage bridge 32 output voltage appearing on leads 41 and 42 remains substantially constant during the temperature variations. The voltage on leads 41 and 42 is proportional to the amount of pre-strain produced in half-bridges 21 and 22, and therefore related to roll force in the post of side frame 15.

It is contemplated that the post may be a different material than cast steel, for example, it may be aluminum. In this case, bridge supply 37 may be a constant voltage source to provide the strain gage bridge 32 temperature compensation. Resistor 40 shunt connection would then be changed to a series connection in either lead 38 or 39, thereby providing a slight variation of bridge 32 input voltage across leads 38 and 39 during strain gage temperature variations.

Still referring to FIG. 4, relatively simple and inexpensive strain gage signal conditioning equipment 43 is included in measuring circuits 25. Signal conditioning equipment 43 includes an adjustable gain differential instrument amplifier 44 having a signal amplifying input receiving strain gage bridge 32 output signals on leads 41 and 42, said amplifier also provided with a biasing signal input. Amplifier 43 gain setting is adjusted to produce a first output signal on lead 45 having twice the value of that produced by strain gage bridge 32 alone so as to represent the sum of roll forces in both posts of side frame 15.

Signal conditioning equipment 43 also includes switchable integrator 46 having an integrating signal input receiving the first output signal on lead 45. Integrator 46 is provided with a switching signal input to permit integration of the first output signal during the absence of a switching input signal, the latter condition corresponding to the absence of plate P from mill stand 10 as noted below. Integrator 46 output is fed over lead 47 as a bias signal to the biasing signal input of amplifier 43 in such manner as to automatically null the first output signal during the absence of plate P from mill stand 10. In this way the strain gage bridge circuit 32 is provided with electronic zero balance compensation for the above described thermal and mechanical drift effects, which effects normally produce additional signals from the semiconductor strain elements in half-bridges 21 and 22.

Again referring to FIG. 4, measuring circuits 25 also include circuit means for connecting half-bridge strain gages 23 and 24 into a full-bridge strain gage circuit 48 which is responsive to roll force strain in the post of work side frame 16. Strain gage bridge circuit 48 is constructed and operated the same as strain gage bridge circuit 32, except that numerical references are different in circuit 48. Balancing resistors 49 to 52 are provided for the same purpose as balancing resistors 33 to 37. Bridge supply 53 preferably provides a constant current source, or alternatively a constant voltage source, at bridge circuit 48 input leads 54 and 55 so as to operate strain gage bridge circuit 48 for the same energizing and thermal compensating reasons applying to bridge supply 37. Likewise, modifying resistor 56 acts on bridge circuit 48 input leads 54 and 55 in the same manner as resistor 40 does on bridge circuit 32 input leads 38 and 39. Finally, the output signal from bridge circuit 48 appears on bridge output leads 57 and 58 as a voltage proportional to the sum of the strain in half-bridges 23 and 24, and is therefore related to roll force in the work side frame 16.

Also included in signal conditioning equipment 43 is adjustable gain instrument amplifier 59, which is the same as amplifier 44, the former receiving the bridge circuit 48 output signal on leads 57 and 58 producing a second output signal on lead 60 similar to the first output signal on lead 45. Switchable integrator 61, which is the same as integrator 46, integrates the second output signal during the absence of plate P from mill stand 10. Integrator 61 feeds this integrated signal over lead 62 as a bias signal to the biasing input of amplifier 59 in such manner as to automatically null the second output signal during the absence of plate P from mill stand 10. In this manner the strain gage bridge circuit 48 is provided with electronic zero balance compensation like that of bridge circuit 32.

Further included in signal conditioning equipment 43 is selector switch 63 which selects either the first or second output signals respectively fed over leads 45 and 60 to position "$d$" and "$w$", respectively. The selected output signal is fed over lead 64 to the input of level detector 65 which differentiates between the absence and presence of plate P in mill stand 10. During the absence of plate P, there is an absence of an output signal on lead 66. When plate P of predetermined minimum thickness enters mill stand 10, the strain gage bridge circuit 32 or 48 becomes sufficiently unbalanced that amplifier 44 or 59 produces an output signal on lead 45 or 60 of sufficient magnitude to correspond to an excess of the minimum thickness of plate P, thereby triggering level detector 65. At this instant a presence switching signal appears on lead 66 and this signal is applied as the switching signal to the switching signal inputs of both integrators 46 and 61 to hold their outputs constant. Simultaneously, the nulling function of amplifiers 44 and 59 is ceased and the instantaneous null value on leads 45 and 60 represents the zero roll force in the posts of side frames 15 and 16. Thereafter, any change in the first or second output signal on leads 45 and 60 represents the instantaneous roll force in the posts of side frames 15 and 16, respectively.

When plate P leaves the mill stand 10, a reduction in roll forces is detected by level detector 65, thereby signifying the absence of plate P by the absence of a switching signal on lead 66. Thus, both integrators 46 and 61 return to their integrating function and vary the bias on their associated amplifiers 44 and 59 to again automatically null the first and second output signals on leads 45 and 60, respectively, until the next plate P presence is detected by level detector 65.

To complete the measuring circuits 25, summing amplifier 67 is provided to receive the first and second output signals fed over leads 45 and 60 and produce a summed output signal on lead 68 which represents the total roll forces in the side frames 15 and 16 of rolling mill stand 10. Selector switch 69 is provided to receive the first, second and summed output signals fed over leads 45, 60 and 68, respectively, to switch 69 positions "$d$", "$w$" and "$s$", respectively, and to select one of these signals for transmission over lead 70 to roll force indicator 26, or alternatively, controller 19. Although not shown on the drawing, any one or all of the three output signals may be fed to another utilization device such as a computer for assimilation therein.

We claim:

1. Roll force measuring apparatus for a rolling mill stand having a pair of frames with spaced apart posts adapted to movably constrain rolls operatively associated with a workpiece, said mill stand including means reacting against said posts for applying a working force to said rolls, said measuring apparatus comprising:
   a. first and second strain gage means each adapted to be mounted on opposing strain sites on a predetermined post of each said pair of frames
   b. measuring circuit means connected to said first and second strain gage means for producing an output signal proportional to the sum of post strains as a function of total roll force, said measuring circuit means including first and second electronic circuit means connected to said first and second strain gage means, respectively, and adapted to automatically null said output signal in response to a strain gage means variation occurrable during the absence of a workpiece, said measuring circuit means including a third electronic circuit means selectively responsive to either one of said first or second strain gage means and operative on both said first and second electronic circuit means to maintain said output signal null value at the magnitude occurring the instant the presence of a workpiece is detected, and
   c. circuit means for connecting said output signal to utilization means.

2. The apparatus of claim 1 further including:
   d. means for utilizing said output signal to determine total roll force.

3. Roll force measuring apparatus for a rolling mill stand having a pair of frames with spaced apart posts adapted to movably constrain rolls operatively associated with a workpiece, said mill stand including means reacting against said frame posts for applying a working force to said rolls, said measuring apparatus comprising:
   a. strain gage means adapted to be mounted on opposing strain sites on a predetermined post of each said pair of frames, said strain gage means including a pair of semiconductor strain sensing elements circuited in a half-bridge at each strain site, each half-bridge on a given frame post being arranged with that of an opposing site to form a full-bridge circuit responsive to the strain present at opposing strain sites on said given frame post, whereby said strain gage means provides first and second strain-responsive circuits associated with said pair of frames,
   b. measuring circuit means connected to said first and second strain responsive circuits of means (a) for producing an output signal proportional to post strain as a function of roll force, said measuring circuit comprising:
      1. circuit means for initially balancing the impedance of each said first and second strain gage bridge circuits where required,
      2. first and second constant current sources for energizing said first and second strain gage bridge circuits,
      3. first and second amplifiers each having a bias input and a signal amplifying input, the latter input of said amplifiers being responsive to said first and second strain gage bridge circuits for producing first and second output signals, respectively,
      4. first and second switchable integrators each having a switching input and a signal integrating input, the latter input of said integrators being responsive to said first and second output signals for producing the respective bias input signals for said first and second amplifiers in such manner as to independently and automatically null the first and second output signals, respectively, said nulling function occurring during the absence of an integrator switching input signal which corresponds to the absence of said workpiece,
      5. a level detector responsive to one of said first or second output signals for producing the switching signal for said first and second integrators so as to maintain said first and second output signal null values at their respective magnitudes which occur the instant the presence of a workpiece is detected, the presence of said switching signal corresponding to the presence of said workpiece, and
      6. a third amplifier for summing the first and second output signals so as to produce a summed output signal,
   c. circuit means for preferably connecting said summed output signal to utilization means, or alternatively, connecting either of said first or second output signals thereto, and
   d. means for utilizing either said first, second or summed output signals to determine roll force.

4. Roll force measuring apparatus comprising:
   a. a rolling mill stand having a pair of frames with spaced apart posts adapted to movably constrain rolls operatively associated with a workpiece, said mill stand including means reacting against said frame posts for applying a working force to said rolls,
   b. first and second strain gage means each adapted to be mounted on opposing strain sites on a predetermined post of each said pair of frames,
   c. measuring circuit means connected to said first and second strain gage means for producing an output signal proportional to the sum of post strains as a function of total roll force, said measuring circuit means including a first and second electronic circuit means connected to said first and second strain gage means, respectively, and adapted to automatically null said output signal in response to a strain gage means variation occurrable during the absence of a workpiece, said measuring circuit means including a third electronic circuit means selectively responsive to either one of said first or second strain gage means and operative on both said first and second electronic circuit means to maintain said output signal null value at the magnitude occurring the instant the presence of a workpiece is detected,
   d. circuit means for connecting said output signal to utilization means, and
   e. means for utilizing said output signal to determine total roll force.

* * * * *